(12) United States Patent
Assinck

(10) Patent No.: US 10,704,218 B2
(45) Date of Patent: Jul. 7, 2020

(54) COUPLING DEVICE

(71) Applicant: Dream View Enclosures Inc., Apsley (CA)

(72) Inventor: Adrian J. Assinck, Apsley (CA)

(73) Assignee: DREAM VIEW ENCLOSURES INC., Apsley (CA)

( * ) Notice: Subject to any disclaimer, the term of this patent is extended or adjusted under 35 U.S.C. 154(b) by 0 days.

(21) Appl. No.: 16/266,872

(22) Filed: Feb. 4, 2019

(65) Prior Publication Data

US 2019/0242084 A1 Aug. 8, 2019

Related U.S. Application Data

(63) Continuation of application No. 15/585,337, filed on May 3, 2017, now abandoned, which is a continuation-in-part of application No. 15/480,944, filed on Apr. 6, 2017, now abandoned.

(51) Int. Cl.

| | |
|---|---|
| *E02B 3/16* | (2006.01) |
| *E05D 3/18* | (2006.01) |
| *E05D 7/04* | (2006.01) |
| *E05D 7/10* | (2006.01) |
| *B63C 1/02* | (2006.01) |
| *E02B 3/06* | (2006.01) |
| *B63B 7/04* | (2020.01) |
| *B63B 35/36* | (2006.01) |
| *F16B 2/10* | (2006.01) |
| *F16B 2/12* | (2006.01) |
| *F16B 9/00* | (2006.01) |

(52) U.S. Cl.
CPC ............. *E02B 3/16* (2013.01); *B63B 7/04* (2013.01); *B63B 35/36* (2013.01); *B63C 1/02* (2013.01); *E02B 3/068* (2013.01); *E05D 3/18* (2013.01); *E05D 7/043* (2013.01); *E05D 7/10* (2013.01); *E05D 2007/0446* (2013.01); *E05D 2007/0453* (2013.01); *E05D 2007/0469* (2013.01); *E05D 2007/0484* (2013.01); *F16B 2/10* (2013.01); *F16B 2/12* (2013.01); *F16B 9/054* (2018.08)

(58) Field of Classification Search
CPC combination set(s) only.
See application file for complete search history.

(56) References Cited

U.S. PATENT DOCUMENTS

| | | | |
|---|---|---|---|
| 5,529,012 A * | 6/1996 | Rytand | ............ B63C 1/02 114/263 |
| 6,722,643 B1 * | 4/2004 | Kurtz | ............ B25B 5/10 269/249 |
| 2011/0101587 A1 * | 5/2011 | Quintania | ............ B25B 5/006 269/74 |

FOREIGN PATENT DOCUMENTS

CA 2885943 A1 * 9/2016 ............. B63B 35/34

* cited by examiner

*Primary Examiner* — Kyle Armstrong
(74) *Attorney, Agent, or Firm* — Barnes & Thornburg LLP

(57) ABSTRACT

Described are various embodiments for coupling devices for dock installations.

11 Claims, 14 Drawing Sheets

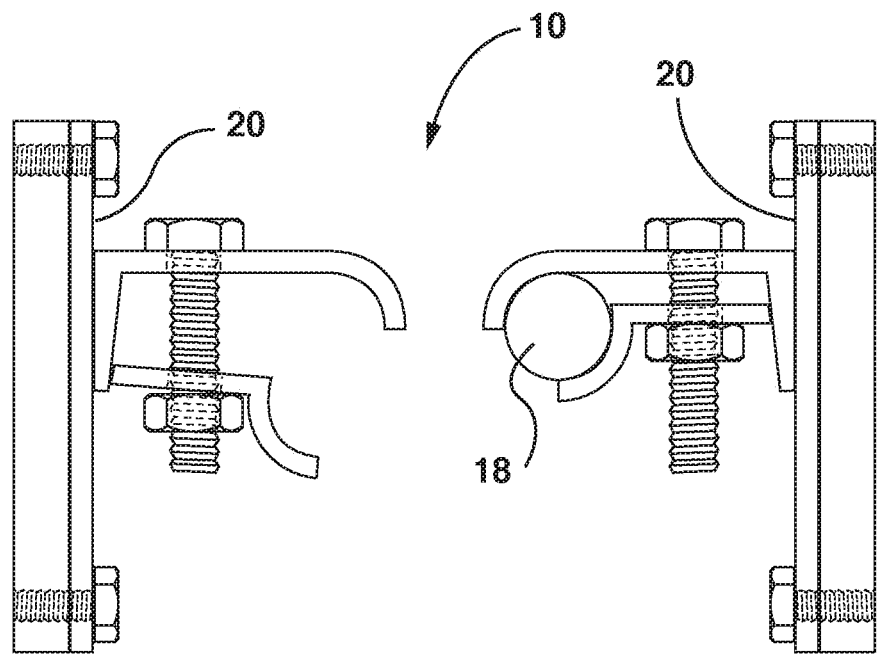
FIG. 12
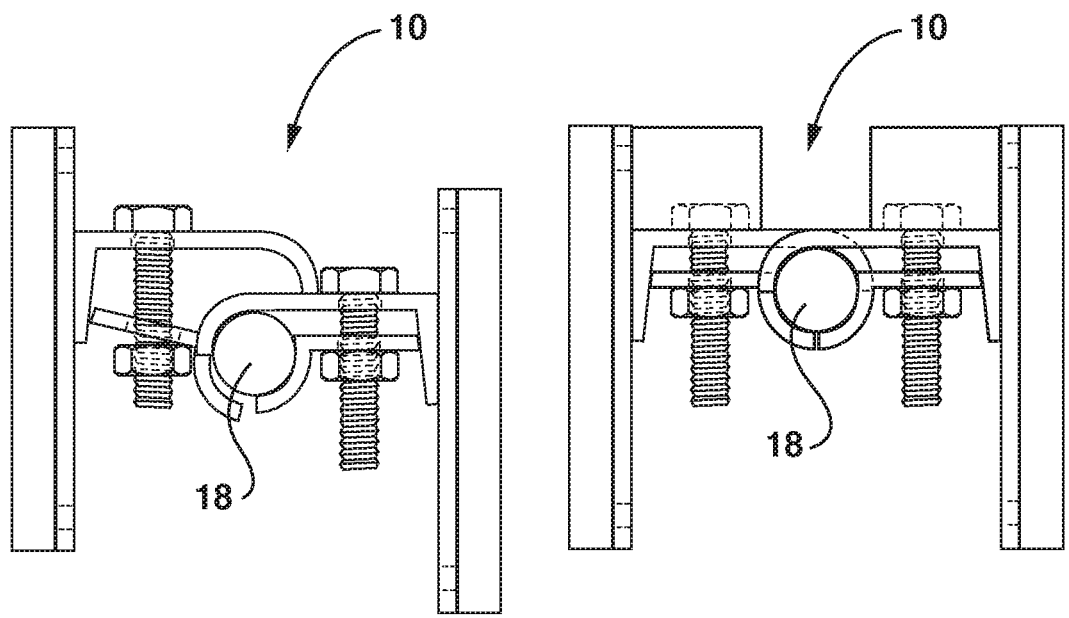
FIG. 13
FIG. 14

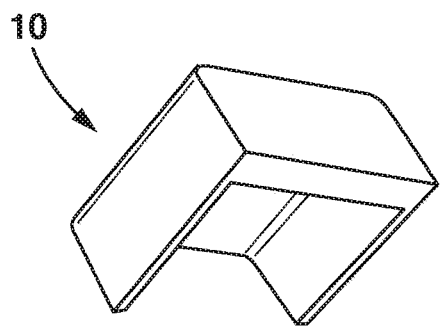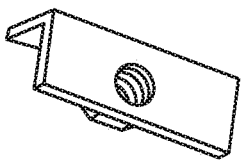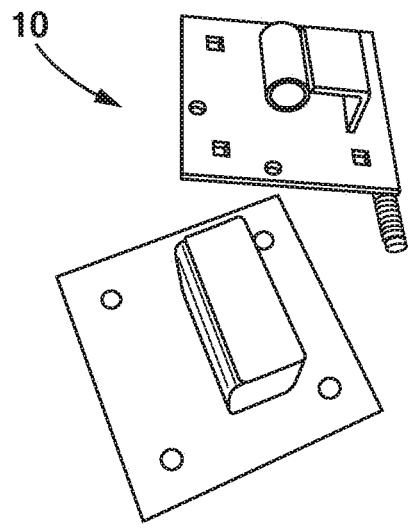
FIG. 17  FIG. 18
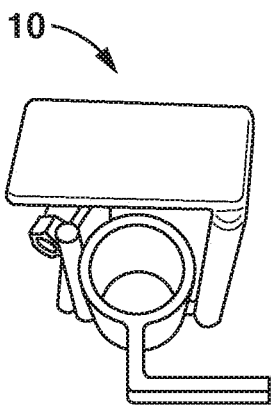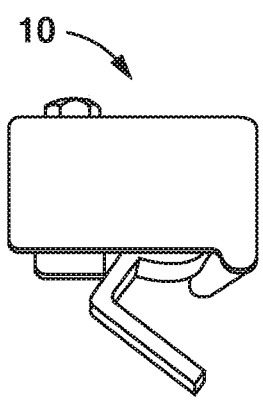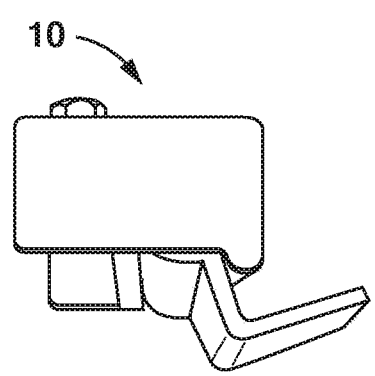
FIG. 19  FIG. 20  FIG. 21
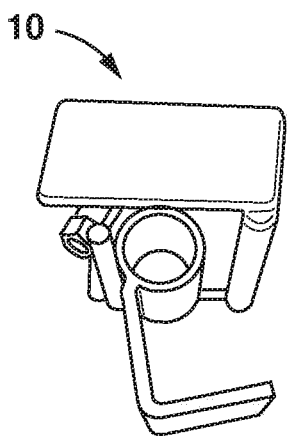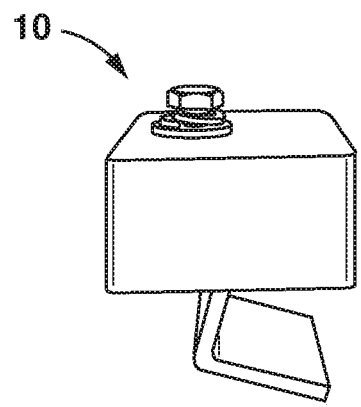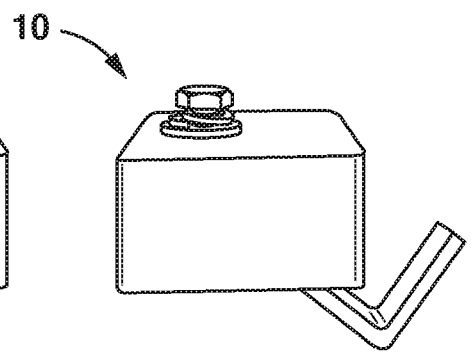
FIG. 22  FIG. 23  FIG. 24

COUPLING DEVICE

REFERENCE TO CO-PENDING APPLICATION

This application is a Continuation-in-Part of co-pending U.S. patent application Ser. No. 15/480,944 filed Apr. 6, 2017, the entire subject matter of which is incorporated herein by reference, including all information originally submitted to the U.S. Patent Office.

FIELD OF THE DISCLOSURE

The present disclosure relates to coupling devices, more particularly for use in assembling adjacent segments of a dock.

BACKGROUND

Summers at the cottage have become an important tradition for many Canadians. Included in the tradition is the opening of the cottage, and the installation of the "dock". The cottager will either do this on their own or hire contractors to complete the installation. Often, they are formed from dock segments which pivot together by way of a pin joining adjacent dock hinges together. Docks come in a variety of forms including floating and/or stationary, usually with multiple segments made from a variety of materials such as wood and aluminum.

Installing a dock is normally done with a hinge-type coupling of having matching hinge plates (similar to those of a door hinge) installed on facing ends of adjacent dock segments. The difficult part of the installation arises when attempting to line up and install a close fitting pin in opposing hinge plates with a suitably alignment in order to do so. This means that both sets of hinge plates on opposing ends of dock segment must be aligned in all directions for the insertion of the pin in one of the aligned sets of hinge plates to be successful.

It can be very frustrating to hold and retain the segments of any dock in their exact location to physically maintain the exact alignment in all directions for the pin to be inserted in between a narrow gap between them. All the while, the cottager is trying to avoid pinching fingers, as loads are shifting to insert the pin over open water without dropping the pin, parts and tools into the water. Wave action, current, wind, cold water, and sudden expected shifts of weight by helpers on the dock segments, are some other factors that can complicate the effort. It is, to say the least, rare that a finger is not pinched, or a knuckle is not skinned. Tools must be located and maintained and it is quite likely that, at each successive dock installation effort, more tools, pins, clips and the like, find their way to the bottom of the lake.

SUMMARY

Some aspects of this disclosure may provide a method and apparatus for that overcome some of the drawbacks of known techniques, or at least, provide the public with a useful alternative.

In one aspect, there is provided a coupling device for a joining together adjacent dock segments of a dock installation, comprising:
  a. an elongate pin portion and at least one clamp portion, each positionable on respective dock segments;
  b. the pin portion having at least one elongate first clamp surface aligned along its length with a central longitudinal first axis, the pin portion being configured to be received in a corresponding pin-receiving region adjacent the clamp portion;
  c. the pin-receiving region at least partially bordered by at least one second clamp surface which Is aligned with a second axis; and
  d. wherein the clamp portion is configured to be actuated between an open pin-receiving configuration, at least partially opening the pin-receiving region along the second axis, and a pin-engaging configuration with the first clamp surface engaged with the second clamp surface, the second axis configured to be substantially parallel with the first axis, and with a lateral axis of at least one of the dock segments, for securing the pin portion therewith, so that the pin portion is rotatable relative to the clamp portion about the first axis to accommodate relative movement between the adjacent dock segments.

In another aspect, there is provided a dock segment comprising an upper deck surface, and a designated portion of a pin portion or a clamp portion of a coupling device as defined herein.

In another aspect, there is provided a dock segment comprising a designated portion of a pin portion or a clamp portion of a coupling device as defined herein.

In another aspect, there is provided a pin assembly for use in securing a dock in position, comprising at least one pin portion for use with at least one clamp portion, and at least one pin support portion to support the pin portion, wherein the pin support portion is configured to be mounted on a dock or on an associated anchoring structure.

In another aspect, there is provided a coupling device for use in positioning a dock segment in a dock installation, comprising at least one elongate pin portion positionable on the dock segment or an associated anchoring structure, the pin portion surface aligned along its length with a central longitudinal pin axis, the pin portion being configured to be received in a corresponding pin-receiving region in a clamp portion of an adjacent coupling device.

In another aspect, there is provided a coupling device for use in positioning a dock segment in a dock installation, comprising a clamp portion positionable on the dock segment or an associated anchoring structure, the clamp portion having a pin-receiving region to receive a pin portion of another coupling device, the pin-receiving region being aligned with a clamp axis, wherein the clamp portion is configured to be actuated between an open pin-receiving configuration, at least partially opening the pin-receiving region along the clamp axis, and a pin-engaging configuration with the pin portion held in the pin-receiving region, wherein the clamp axis is configured to be substantially parallel with a pin axis of the pin portion, and with a lateral axis of the dock segment or the associated anchoring structure, for securing the pin portion therewith, so that the pin portion is rotatable relative to the clamp portion about the pin axis to accommodate relative movement between the dock segment and the adjacent dock segment or associated anchoring structure.

In another aspect, there is provided a method of connecting adjacent dock segments of a dock, comprising:
  a. providing a pair of segments of a dock to be installed at a shore location;
  b. providing at least one coupling device of any aspect or exemplary embodiment of the present disclosure, figures and/or claims, with each of the pin portion and the clamp portion positioned on corresponding dock segments; with the clamp portion in the pin-receiving configuration;

c. operatively aligning the first and second surfaces for engagement; and d. actuating the clamp portion to the pin-engaging configuration.

In another aspect, there is provided a method of installing a dock at a designated location, comprising:

a. providing at least one coupling device of the present disclosure, figures and/or claims, wherein the pin portion and the clamp portion are each positioned on corresponding dock segments or a dock segment and an associated anchoring structure; with the clamp portion in the pin-receiving configuration;

b. operatively aligning the pin portion and clamp portion for engagement; and c. actuating the clamp portion to the pin-engaging configuration.

BRIEF DESCRIPTION OF THE FIGURES

Several embodiments of the present disclosure will be provided, by way of examples only, with reference to the appended drawings, wherein:

FIGS. 12, 13 and 14 are successive schematic operational side views of other coupling devices;

FIGS. 17 to 24 show side and perspective views of still other coupling devices.

DETAILED DESCRIPTION

Figure 1:
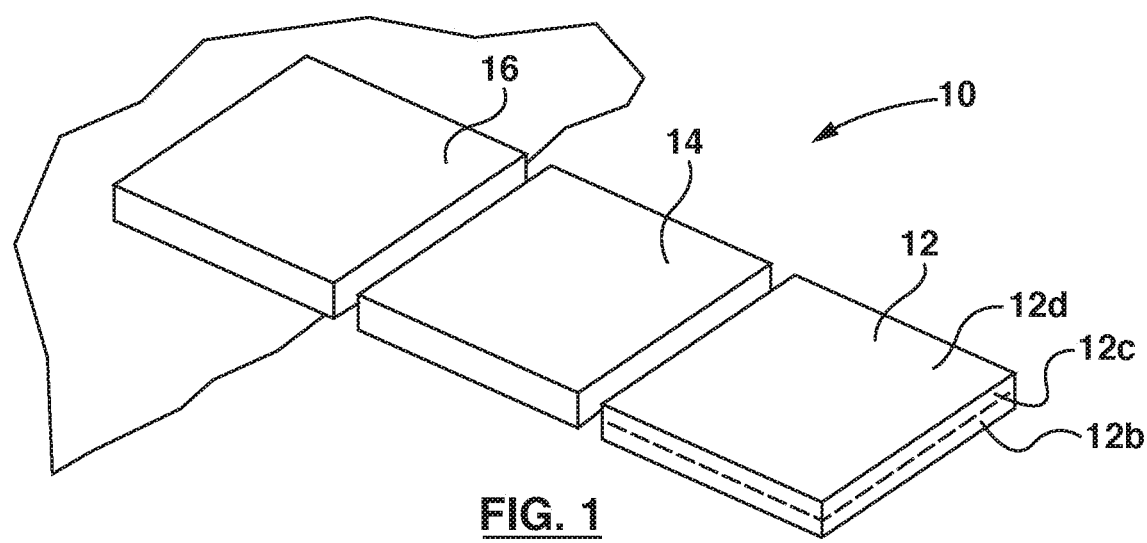
FIG. 1 is a schematic fragmentary perspective view of a dock installation.
Figure 1A:
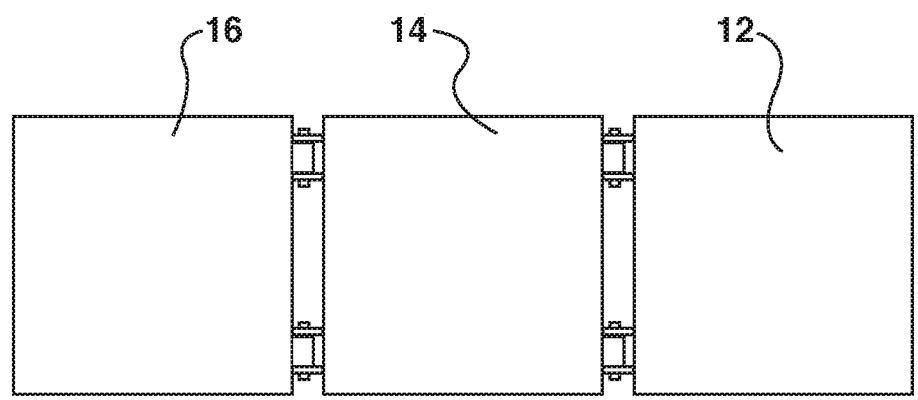
FIG. 1a is a schematic plan view of the installation of FIG. 1.

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The term "dock" means a structure, which is sometimes also known as a wharf, installed at a designated shoreline location for accessing a region adjacent thereto and may include fixed, floating and/or suspended dock configurations and structures joining docks to adjacent shoreline locations or other water based anchoring or other structures such as docks and/or piers, including ramps, stairs and the like. The term "dock segment" means a segment of the dock as defined and may include such things as an upper deck, a set of stairs, other attachment structures for attaching the dock segment to another dock segment or an associated structure, and the like. The term "integral" means to be joined together, so as to form a unitary structure. The term "bite" means an operative portion of a device to grip a surface. Furthermore, and as described in subsequent paragraphs, the specific mechanical and/or other configurations illustrated in the drawings are intended to exemplify embodiments of the invention. However, other alternative mechanical and/or other configurations are possible which are considered to be within the teachings of the instant disclosure.

Referring to the figures, an exemplary embodiment of a coupling device is shown at 10 for joining together adjacent dock segments of a dock installation shown at 12, 14 and 16. The coupling device 10 comprises an elongate pin portion (or bit) 18 and at least one clamp portion (or bite) 20, each of which is positionable on the respective dock segments 12, 14 and 16.

Figure 2:
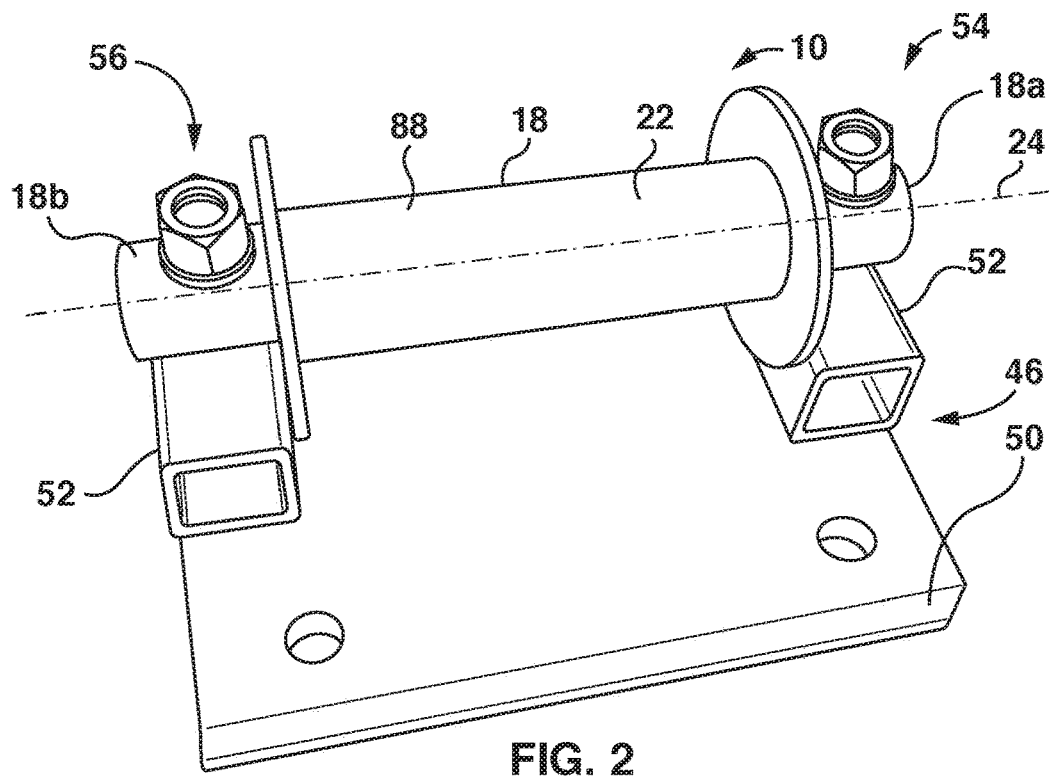
FIGS. 2 and 3 are perspective views of a coupling device in the installation of FIG. 1.
Figure 3:
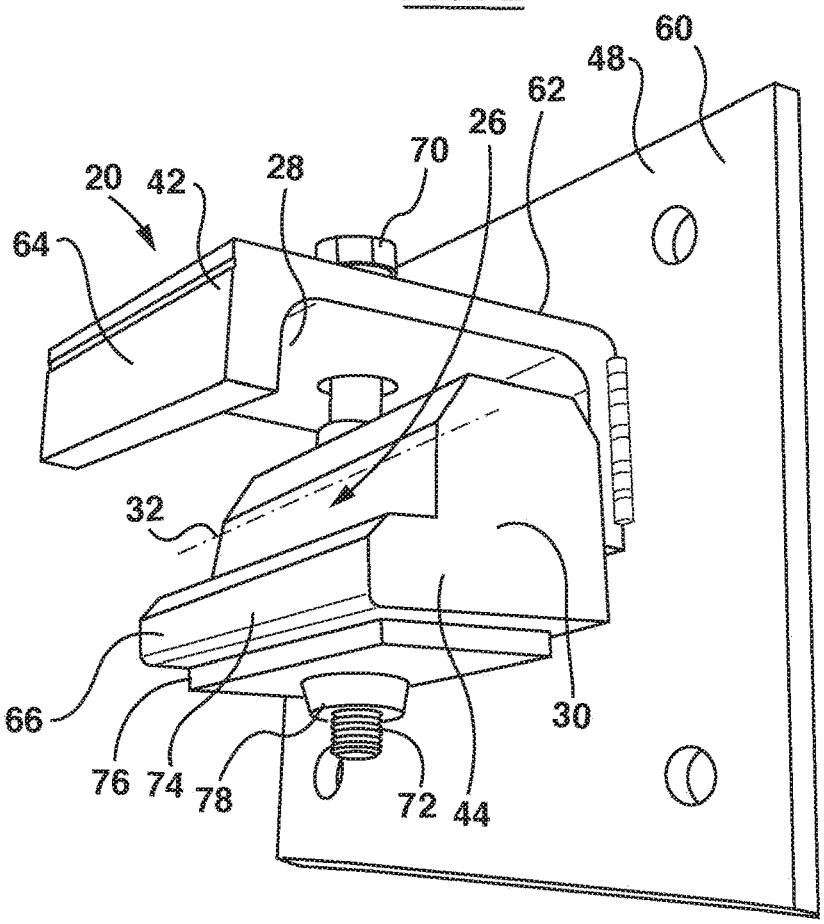

Referring to FIGS. 2 and 3, the pin portion has at least one elongate first clamp surface 22 aligned along its length with a central longitudinal first axis 24. The pin portion is configured to be received in a corresponding pin-receiving region 26 adjacent the clamp portion 20. The pin-receiving region 26 is, in this example, at least partially bordered by at least one, in this case a plurality of second clamp surfaces 28, 30, which are aligned with a second axis 32.

Figure 5:
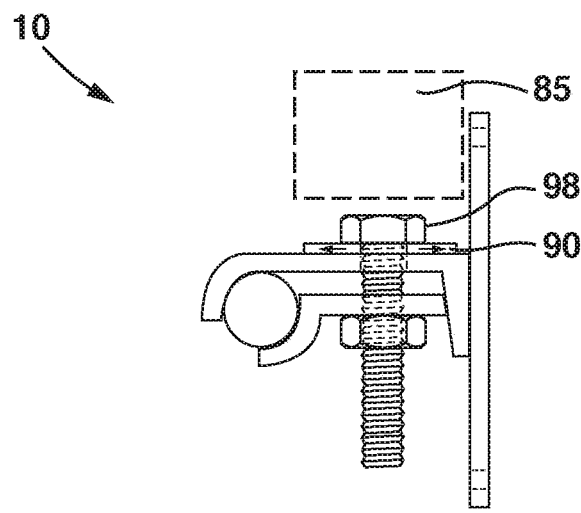

The clamp portion 20 may be configured to be actuated between an open pin-receiving configuration, as shown in FIG. 3, at least partially opening the pin-receiving region along the second axis, and a pin-engaging configuration with the first clamp surface engaged with the second clamp surface (as shown in the embodiment of FIG. 5). The second axis 32 is thus configured to be substantially parallel with the first axis 24, and with a lateral third axis 34 of at least one of the dock segments 12, 14, so that the pin portion 18 is rotatable relative to the clamp portion 20 about the first axis 24 to accommodate relative movement between the adjacent clock segments 12, 14.

The clamp portion 20 has first and second clamp portions 42, 44, each providing one of a pair of the second clamp surfaces 28, 30. It can be seen that the second clamp surfaces are at least partially substantially symmetrical relative to the pin-receiving region 26.

FIGS. 1 and 1a to 1f are for schematic illustration purposes only. The gaps shown between adjacent dock segments do not necessarily reflect actual surface decking gap dimensions that may be achieved with exemplary embodiments herein. Indeed, gaps may be achieved that are, in some cases, narrower than provided by prior art configurations. Such gaps may be dependent on relative dimensions of the components utilized.

Figure 1B:
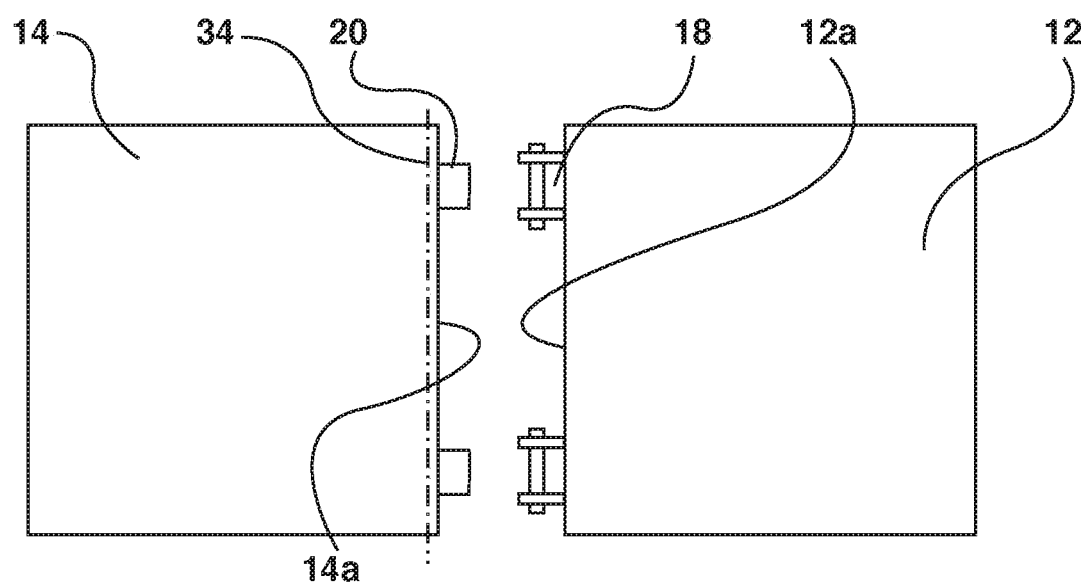
FIG. 1b is a schematic plan view of a portion of the installation of FIG. 1.

Referring to FIGS. 1b, 2 and 3, a pin support portion 46 is configured for mounting the pin portion 18 on a corresponding mounting region 11a on a first dock segment 12, and a clamp support portion 48 is configured for mounting the first and clamp portions on a corresponding mounting region 14a on a second dock segment 14. As shown schematically in FIG. 1, each dock segment may be configured with a frame segment 12b and a deck segment 12c integrally formed with the frame segment 12b or removably positioned thereon, to providing a deck surface 12d.

In some exemplary embodiments, as shown in FIGS. 2, 3, the pin support portion 46 comprises a first base structure 50, and a plurality of support structures, in this case a pair of post structures 52 positioned at designated spaced locations 54, 56 along the pin portion 18. As can be seen, the pin portion 18 has opposed end regions 18a, 18b, and the designated spaced locations 52, 54 are in the respective opposed end regions 18a, 18b.

Figure 1C:
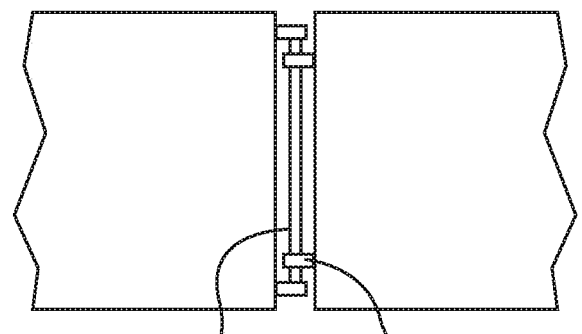
FIGS. 1c, 1d, 1e, 1f, 1g and 1h are schematic views of alternative configurations to that shown in FIG. 1b.
Figure 1D:
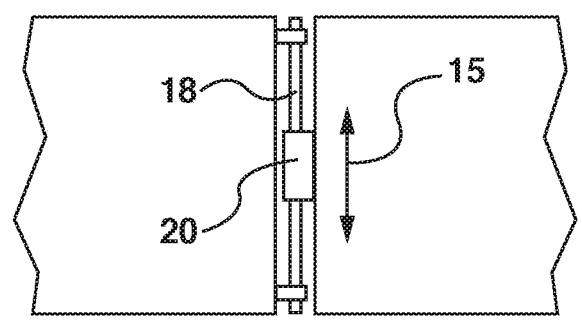
Figure 1E:
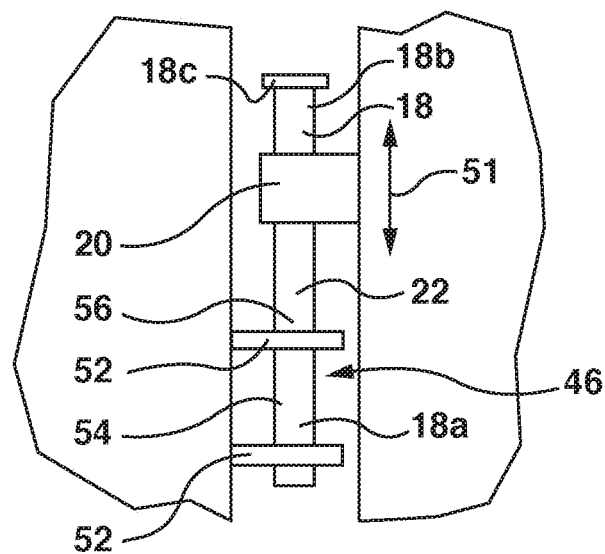

In some exemplary embodiments, such as shown in FIG. 1e, the pin portion may be provided with opposed end regions 18a, 18b, in which one of the designated locations 54 is adjacent end region 18, while the other designated location 56 is between the opposed end regions 18a, 18b. This has the effect of extending the pin portion 18 beyond the pin support portion 46, allowing for offset coupling arrangements that may be of use in some cases. In this case the pin would be provided With a remote end barrier 18c to define an outer surface between the end barrier and the next adjacent pin support post structure 52. Thus, this configuration provides at least one first clamp surface 22 which is offset relative to the designated locations, to receive the clamp portion 20 in an offset manner in relation to the pin portion 18.

Figure 1F:
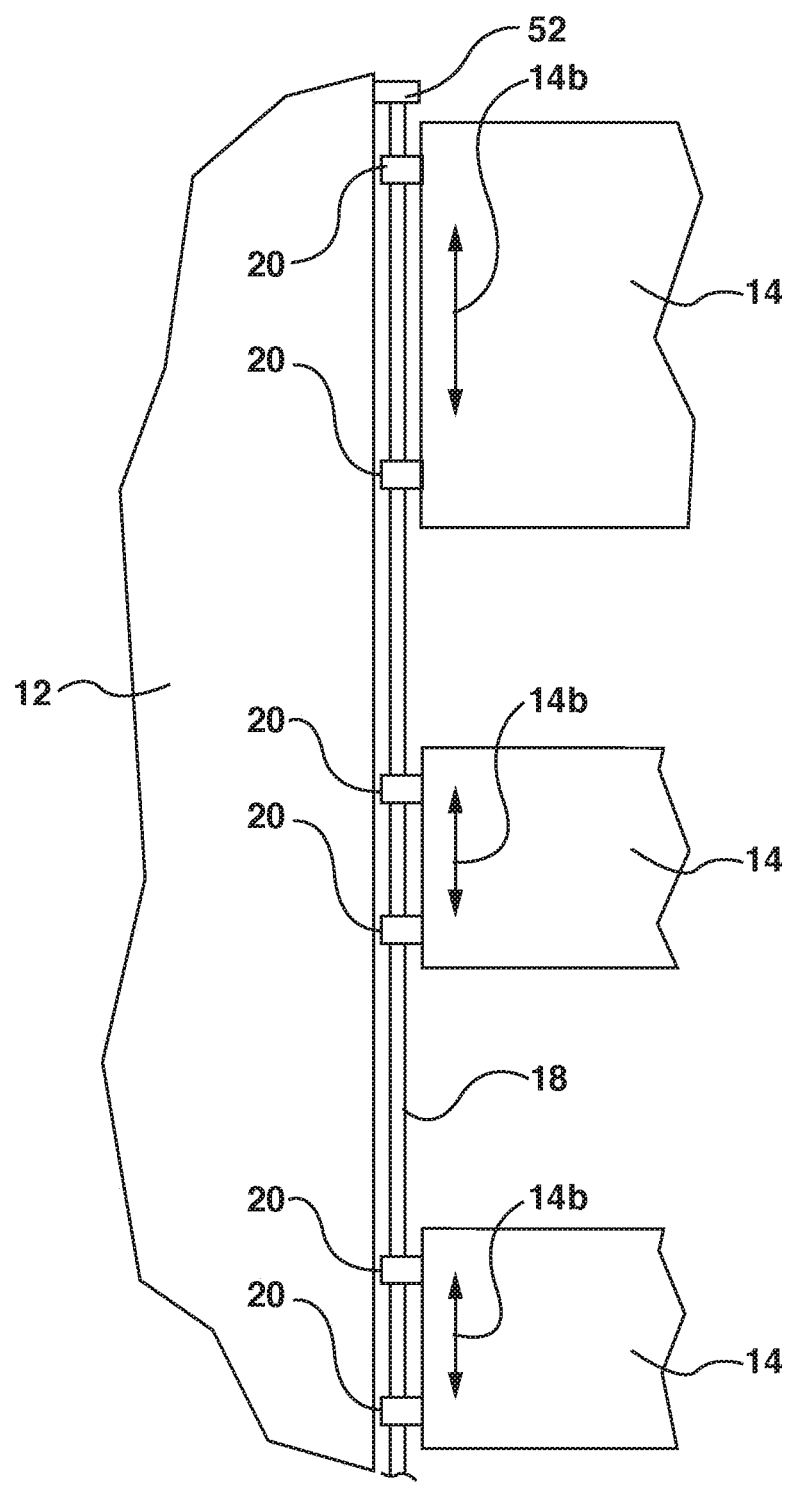

Referring to FIG. 1f, the pin portion 18 may extend a relatively long distance against a correspondingly wide dock segment 12, with dock sections 14 mounted thereon. In this example, the wide dock segment 12 may be positioned on- or off-shore, and enables the dock segments 14 to be shifted as needed, as indicated by the respective double arrows 14b to account for different gaps as needed for boats, water access and the like. In this case, the coupling between the pin portion 18 and the respective claim sections 20 may be configured to provide a relatively loose fitting coupling therebetween, or a relatively tighter coupling and, in both cases may be adjusted by the actuator as needed to permit the dock segments to be shifted, as need be.

In some exemplary embodiments, as shown in FIGS. 1c and 1d, the pin portion 18 may extend in such a manner as to present a first clamp surface 22 which can receive more than one clamp portion (in the case of FIG. 1c) or a single clamp portion (as shown in FIG. 1d), itself presenting a sufficiently long second clamp surface so as to provide a dimensionally stable coupling between the pin and clamp portions 18, 20.

Further, FIGS. 1c, 1d and 1e, may be considered to be representative of a plan view of a dock installation or a side view thereof, with the coupling allowing for horizontal or vertical sliding motion between adjacent dock segments as represented by the double headed arrow 51.

Figure 6:
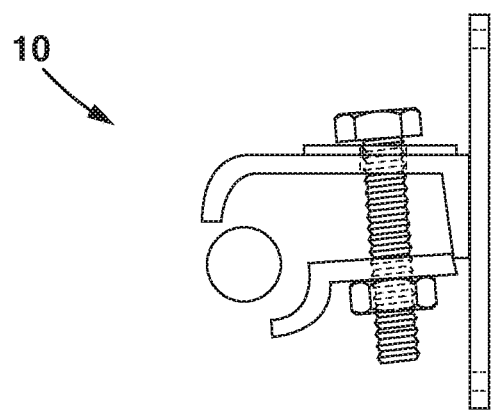
Figure 7:
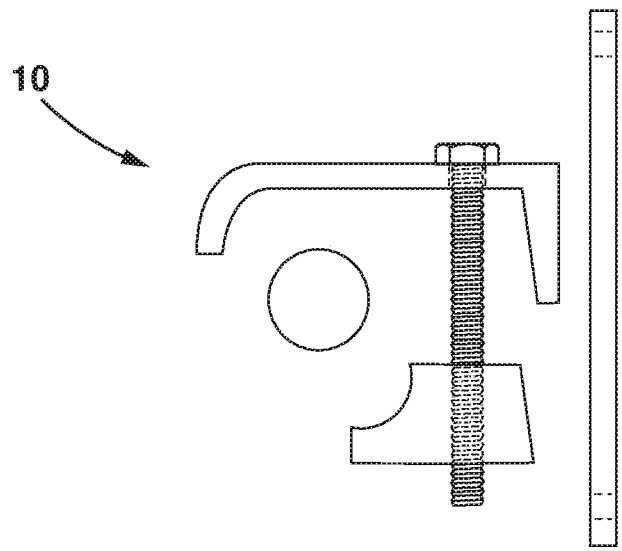
FIGS. 7 and 8 are successive schematic operational side views of another coupling device.
Figure 8:
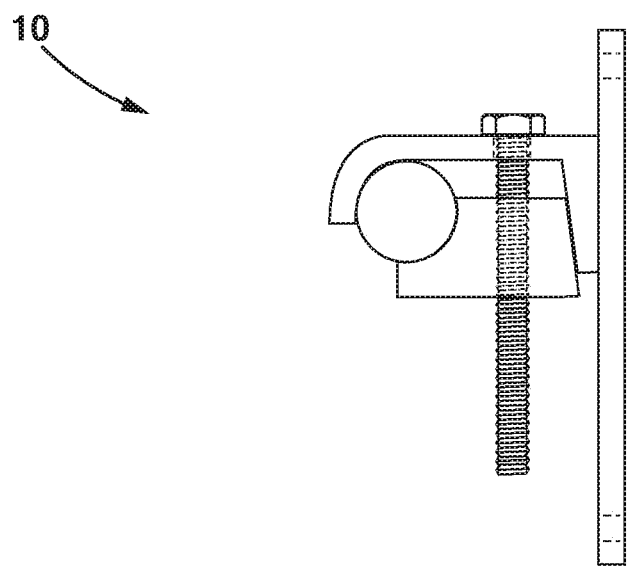

In some exemplary embodiments, as can be seen in FIG. 3, the clamp support portion 48 comprises a second base structure 60, and the first clamp portion 42 includes a flange 62 extending outwardly from the second base structure 60, the flange having boundary region 64 configured to extend downwardly toward a water surface. The second clamp portion comprises a bite 66 which is movable relative to the flange 62 and is configured to be located below the flange 62 and inwardly of the boundary region 64 thereon, as can be seen by the configuration shown in FIGS. 4 to 6.

In some exemplary embodiments, an actuator 70 is operable to displace the first clamp portion relative to the second clamp portion (or vice versa) between the pin-receiving and pin-engaging configurations. In some cases, the actuator 70 may be configured to be accessible from an upper deck surface of the dock segment. In other cases, the actuator may be configured to be accessible from a location other than an upper deck surface of the dock segment 12, 14.

In the example shown in FIG. 3, the actuator 70 includes a threaded member 72 threadably engaged with one of the first and second clamp portions. More particularly, the bite 66 is provided in the form of a polymer block 74 secured to a plate 76, with the plate having a threaded collar 78 to receive the remote end of the threaded member 72 to displace the bite 66 toward the flange 62.

FIGS. 4 to 6, FIGS. 7 and 8, FIG. 9 and FIGS. 10, 11a, 11b and FIGS. 17 to 24 illustrate other exemplary embodiments of a coupling device 10.

Figure 9:
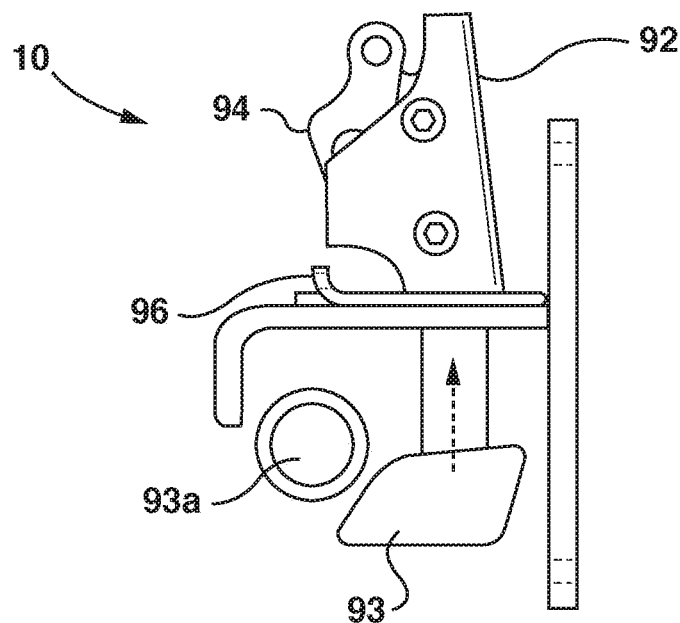
FIGS. 9 and 10 are side view of other coupling devices.
Figure 10:
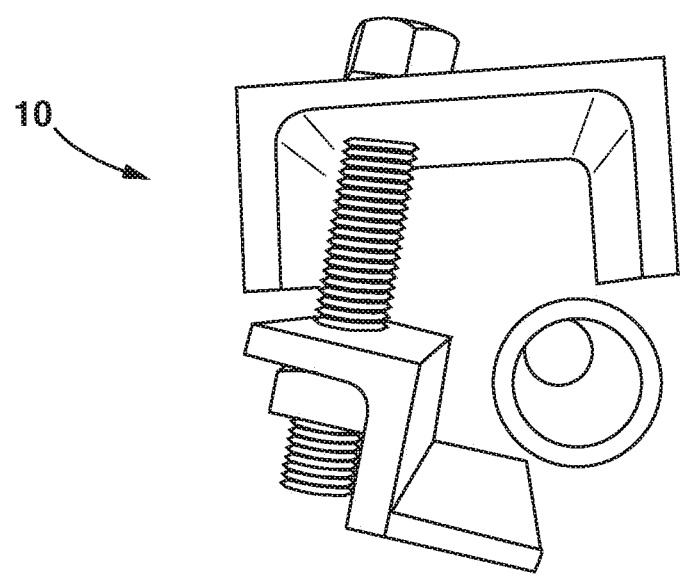

The coupling device 10 of FIG. 9 deploys a latch mechanism 92 of the type used in a trailer hitch, and is provided with a cam 93 which is movable between the open position (as shown in FIG. 9) and a closed position as shown by the dashed arrow, to bring the cam 93 into engagement with the pin 93a, and held in the closed position by the latch 94 which is engaged with the catch 96.

Figure 11A:
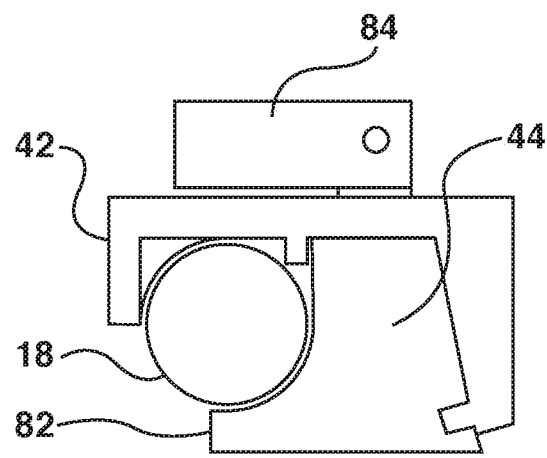
FIGS. 11a and 11b are schematic side views of another coupling device; showing a twisting actuation used to establish a coupling.
Figure 11B:
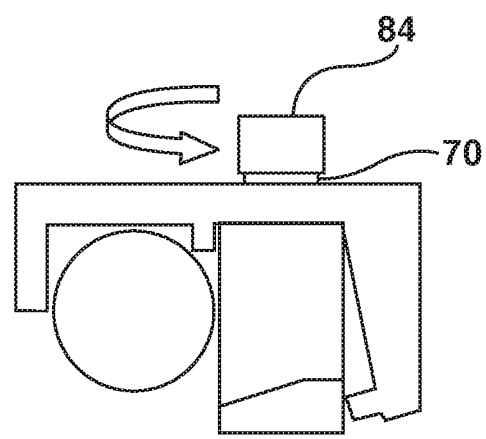

In some exemplary embodiments, as shown in FIGS. 11a and 11b, the actuator 70 may be configured to rotate the second clamp portion 44 relative to the first clamp portion 42. In this case, the second clamp portion 44 may be configured as a cam 82 to displace the pin portion 18 between the pin-engaging and pin-receiving configurations, on rotation thereof, by way of lever 84.

Referring to FIG. 5, the actuator 70 may also include an electric, mechanical hydraulic or air driver, shown schematically at 85, which may be integrally formed with a threaded fastener or the like 98, be separate therefrom, such as can be provided by a manually operated, electrical, mechanical or hydraulic actuator or the like, such as a portable hand tool, a power drill, air drive, solenoid, or the like.

Figure 4:
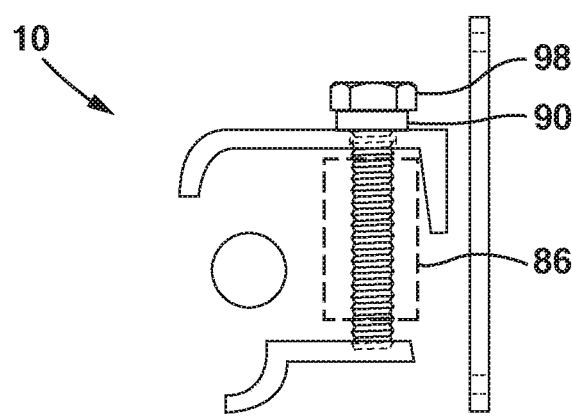
FIGS. 4, 5 and 6 are successive schematic operational side views of another coupling device.

In some exemplary embodiments, as shown schematically at 10 in FIG. 4, the actuator may further comprise a biasing member for biasing the clamp portions toward the pin-receiving configuration or the pin-engaging configuration. In the example schematically shown, the biasing member includes a spring 86.

In some exemplary embodiments, the pin portion and/or the clamp portions may further comprise one or more layers of one or more low-friction materials to form the first and/or second clamp surfaces. In the example of FIG. 2, the elongate pin 18 portion includes an outer sleeve 88 formed of at least one low-friction material with the first clamp surface formed thereon. The first clamp portion and/or the second clamp portion may also, in addition to the pin portion or in the alternative, further comprise a layer formed of at least one low friction material to provide the second clamp surface thereon. In this case, the low friction materials may include a polymeric material.

Some exemplary embodiments further comprise an indicator, operable to indicate when the clamping portion is in the pin-engaging configuration. The indicator may include an indicator member, associated with the actuator, and capable of changing its orientation in a visibly distinctive manner between the pin-receiving configuration and pin-engaging configurations.

In some exemplary embodiments, the indicator member may be provided as a block which, in the pin-engaged configuration is, sufficiently squeezed to become Visible by an operator of the actuator. An example of an indicator of the type described may be seen in FIG. 4 by the block 90 which is seen to expand on compression, under the action of bolt 98, as shown in FIG. 5, thus providing the indication.

In some exemplary embodiments, as shown in FIGS. 12 to 14, the pin portion 18 may be configured with a length sufficient to be received by a plurality of instances of the clamp portion 20. Further, the pin portion 18 may also, in this example, be a linking element between a pair of clamp portions 20 without the pin being anchored to a corresponding dock segment or associated anchoring structure. In this manner, the pin portion 18 may be provided with a pair of end regions or other formations enabling the pin portion 18 to be held in the clamp portions 20 while permitting relative rotation therebetween.

In some exemplary embodiments, the pin may be provided by a pin support portion which may take the form of a clamp portion. Thus, in this example, a plurality of clamp portions may be mounted on facing surfaces of the neighbouring dock segments with each engaging a common pin member.

In some exemplary embodiments, a dock segment may include a frame structure which may be fabricated with an upper deck surface, and a designated portion of a pin portion or a clamp portion of a coupling device according to one or more of the exemplary embodiments disclosed. The designated portion may be removably attached to the dock segment, or alternatively one or more components thereof may be integrally formed therewith.

In some exemplary embodiments, the dock segment may include one or more of a floating or non-floating dock span, a ramp, a pier and/or a dock anchor.

In some exemplary embodiments, the following method may be deployed to connect adjacent dock segments of a dock together, comprising:

a. providing a pair of segments of a dock to be installed at a shore location;
  b. providing at least one exemplary embodiment disclosed herein, of a coupling device, with each of the pin portion and the clamp portion positioned on corresponding dock segments; with the clamp portion in the pin-receiving configuration;
  c. operatively aligning the first and second surfaces for engagement; and
  d. actuating the clamp portion to the pin-engaging configuration.

Figure 1G:
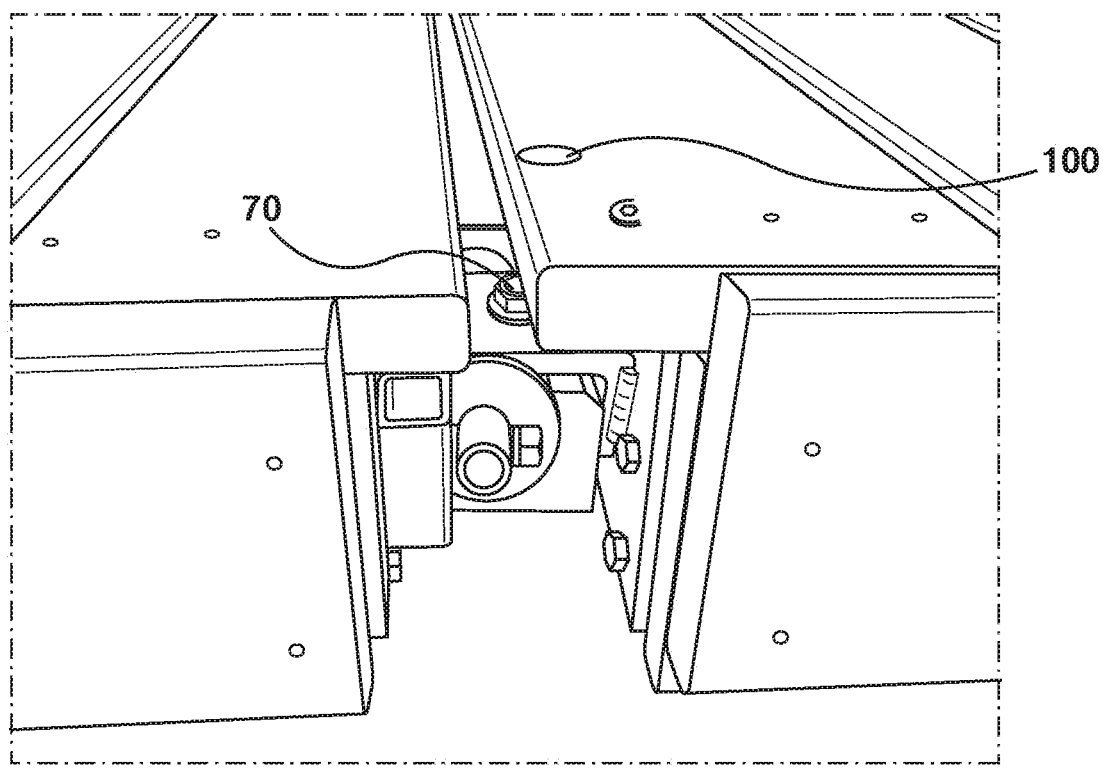
Figure 1H:
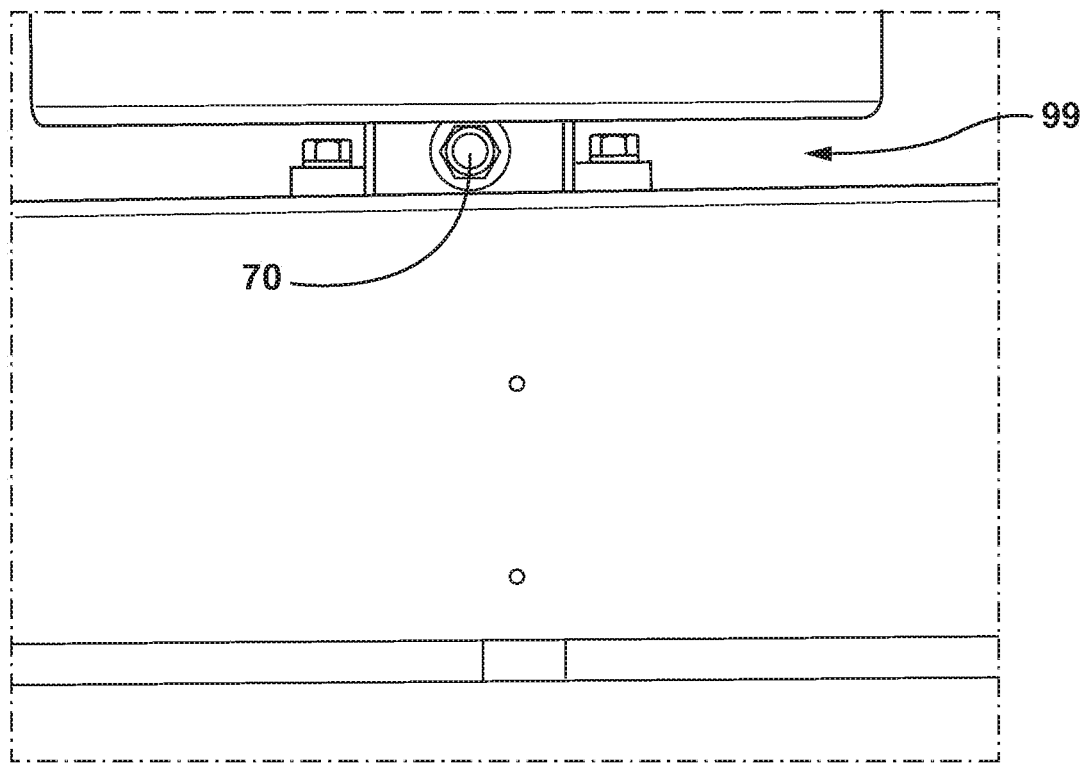

Thus, some exemplary embodiments may provide a self-contained, single operating one part function, in an actuator apparatus that retains the moving parts keeping them within itself. Actuation may be operated from opposing sides, or the preferred desired location such as the flat surface of above and on the dock, and may offer an ability to maintain a narrow surface gap over the dock hitch—hinge coupler for consumer Safety and the ability to do so without reducing and restricting the ability to disconnect the coupling device through an independently created gap or access, hole, as seen at 98 and 100 in FIGS. 1h and 1g respectively. Exemplary embodiments may be utilized at the onset of, and throughout, the cottage season and in some cases enabling the coupling of adjacent dock segments to be carried out by one installer. In some cases, the installer may facilitate the coupling function by shifting his weight on the dock to entrap the pin-bit retained by clamp-bite housing prior to engagement of tooling to actuation apparatus for integral unity Some exemplary embodiments may thus reduce the physical needs normally required to hold shoreline ramps and loads at their elevated location over open water. First, a single pin portions with a relatively long first clamp surface, or a pair of pin portions with relatively shorter first clamp segments, may be aligned with a pair of clamp portions, which may involve lowering the elevation of the pin portion(s) by shifting loads on the corresponding dock Segment to lower it into the water, sufficient to enter the clamp segments from below and then, through the buoyancy of the corresponding dock segment, rise into a pre-clamping aligned condition with the first and second clamp segments in aligned with and in contact with one another and with the first and second axes also substantially in alignment with one another. In so doing, the dock segments will tend to self-align while the operator can act on the actuator to bring the pin and clamp portions to a clamped or pin-engaging configuration.

Some exemplary embodiments may be fabricated from a range of environmentally stable materials; and may offer a wide range of swing or rotation motion, such as up to 360 degrees in some cases, particularly with offset pin-clamp arrangements and the like, while operable to be actuated and de-actuated with as little as half of a pin's diameter, in a direction transverse to the first and second axes.

Some exemplary embodiments may reduce the need for left and right matching pairs, since the clamp and pin portions may be reversible, invertible, spaced apart, positioned immediately adjacent one another, independent or apart along an axis, and that be provided, if desired, to inhibit substantial lateral movement relative to the first and/or second axes, or alternatively enable a horizontal to vertical slip coupling with a predetermined range of lateral movement, in this case provided by a first pin-bit clamp surface length to exceed the corresponding effective length of the second clamp-bite surface.

Some exemplary embodiments may provide an actuator to include a standard bolt operatively coupled to a cammed bite, thus transferring the clamp-bite from a pin-bit receiving configuration to a pin-bit engaging configuration by the rotational displacement of the dammed bite, wherein the standard bolt is driven by hand tools, or by other mechanical, electrical solenoid, or hydraulic actuation methods.

Some exemplary embodiments may provide a spring mother biasing element to bias the clamp-bite toward either the pin-engaging or pin-receiving configurations, to aid in the coupling procedure between pin-bit and clamp-bite to improve functions ability of receiving pin or bit when used in vertical or inverted planes, or otherwise without the aid of gravity.

Some exemplary embodiments may provide a hinge coupling which, when in use, is configured to maintain a permanent minimal surface gap needed between adjacent dock segments, which thus offers a safety feature for children and pets accessing the dock surface by reducing gaps normally seen between dock segments, and improved visual appeal by enhancing an appearance of continuity from one dock segment to another, while maintaining designated lateral and longitudinal tolerances, vertical swing motion to accommodate the natural undulations of the water surface, while minimizing unwanted tilted swing motion (ie the dock tipping from one side to the other) caused, for instance, by waves approaching the dock from either side.

Some exemplary embodiments may provide a coupling apparatus that may be fabricated with or without a mounting or attachment flange and may be configured as an attachment for a direct weld, bolt, or other conventional fastening system onto dock structure or segment framing, and formed using a range of fabrication techniques.

Some exemplary embodiments may provide a coupling apparatus and or its components of conventional standards materials, coated or not, formed and/or extruded materials and alloys, composites, castings, or injection moldings, or other terms of fabrications to conform to its nature of use and attachment processes.

Some exemplary embodiments provide a coupler for use as marine dock hinge/connector coupler system, which may be actuated from above the upper dock deck surface, while requiring relatively little effort to lift and hold, and maintain consistent loads on adjacent dock segments, while also, reducing risks of injury caused by pinched fingers etc. and alleviating aggravations of supporting and maintaining alignment and of dock segments. In other cases, the coupler may support itself while maintain the loads and alignments between the adjacent dock segments before actuating.

Some exemplary embodiments may provide actuation by way of a threaded bolt that may be driven or drawn between the engaged and disengaged positions by the use of a single tool, using a mechanical wrench, socket, power drill, or the like. Alternatively, a cam actuator may be used by way of a manually operated lever or an electrical, mechanical, or hydraulic actuator or the like, such as shown at 85 in FIG. 5, in some cases alleviating a need for deck surface-accessible gaps and or disruptions.

Some exemplary embodiments may provide the pin or bit portion with a cross section that may be round, square, oval, cylinder shape, pipe, shaft, short or long, continuous or discontinuous, as a shaft, a rail, strait or bent, preformed "U"-shaped, and attached independently through its self or directly affixed to opposing sides. In some cases, where the pin or bit portion and the corresponding clamp or bite are non circular, the coupling configuration may not necessarily result in substantial relative rotational movement between them. In this case, such relative movement may be provided by the respective associated support structures.

In some embodiments, the pin-bit or clamp-bite may be formed with low friction or hardened materials, thus not requiring a sleeve.

Some exemplary embodiments may provide the pin-bit and/or clamp-bite portions with substantially unequal or equal effective lengths, while the pin-bit portion may also be provided as a bolt with bushings, bearings, sleeves and retainer washers held by a nut or other means of attachment between two opposing supporting members.

Some exemplary embodiments may provide a dock coupler which provides a connection between two dock segments where the pin-bit and/or clamp-bit may be provided with a range of different-surface configurations, each integrally formed with the corresponding dock segment, and capable of being released, using a conventional drive tools such as a power drill, in some cases.

Some exemplary embodiments may be deployed with the first and/or second axes oriented perpendicular to a corresponding dock segment axis, such as by aligning the first and second axes vertically and establishing a slip pin-engaging configuration, as shown at FIG. 1e, allowing one or each of the so-coupled dock segments to be displaceable relative to the other in a vertical slip movement, as opposed to a vertically pivoting movement as is provided when the first and second axes are oriented horizontally.

Some exemplary embodiments may provide the use of bushings and sleeves to allow for the multitude and combination of metals or other materials in the formation of the components of the coupling while addressing galvanic reactions (oxidation) that may occur with some materials due to direct contact and environmental conditions (i.e. salt water, water and emersion in water).

Some exemplary embodiments may provide the ability to assemble and disassemble framed structured pipe, aluminum, wood, and composite framed docks decked independently without necessarily needing to climb into the water. This may be accomplished by progressively installing dock segments one-by-one, out into the water, and then by removing the dock segments in reverse. In both installation and removal, the dock segment next to install/remove, may be carried/dragged over the already installed (or as yet uninstalled) dock segments, on a first in, last out basis.

Figure 15:
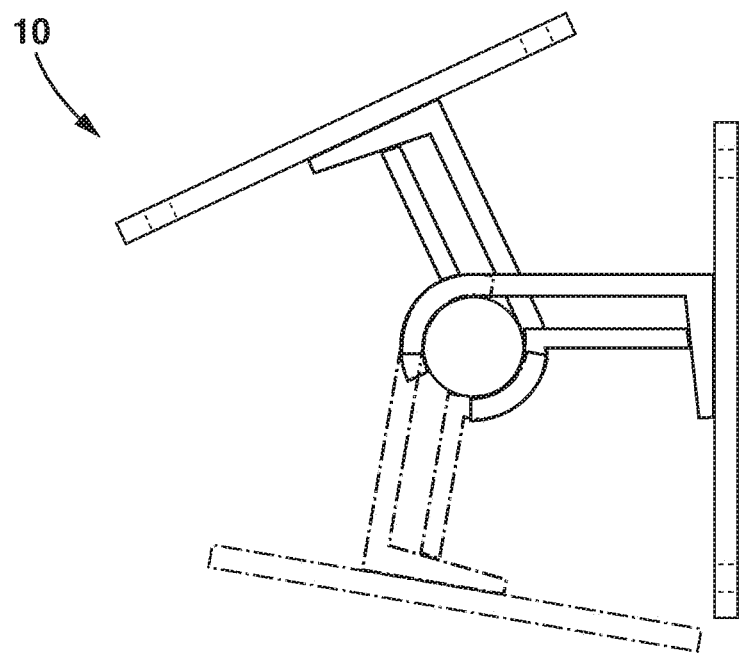
FIGS. 15 and 16 are successive schematic operational side views of other coupling devices.
Figure 16:
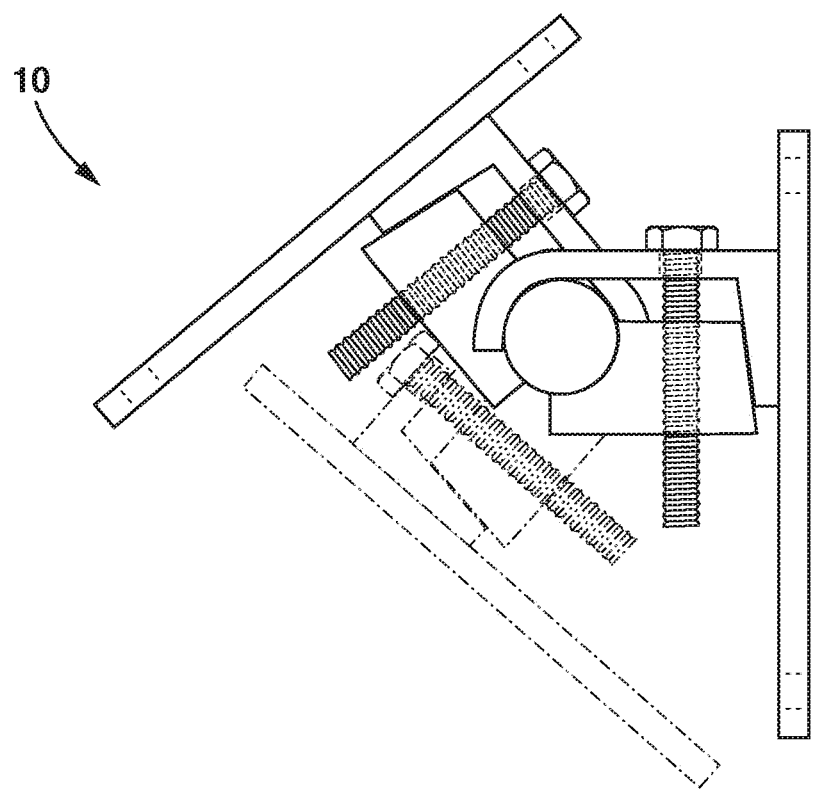

In some exemplary embodiments, as seen in FIG. 15, a dock segment may be installed by aligning the pin-bits with the corresponding clamp-bites, while the dock segment is in a vertical position, the actuated to the pin-engaged configuration, then be rotated downwardly into the water, and then removed in reverse order.

Some exemplary embodiments may provide a clamp or bite housing with closed ends, as can be seen in FIGS. 17 to 24, to provide a closed housing providing the second clamping surface with a passage to enable a pin-bit of a length to fit inside the housing to enter same, thus retaining and isolating the pin-bit, enabling rotation about the first and second axes, but while preventing a swivel movement therebetween.

Figure 25:
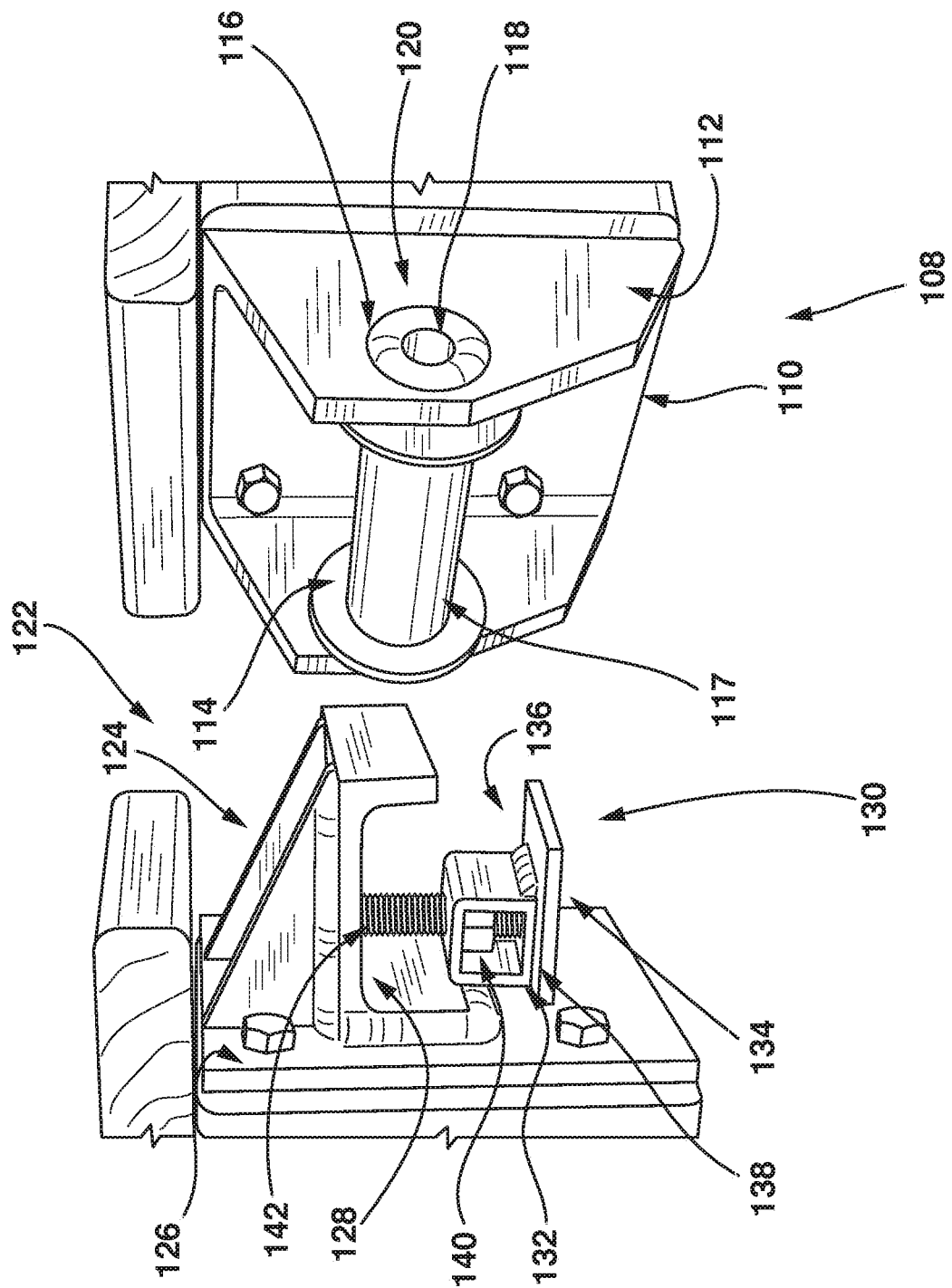
FIGS. 25 and 26 are perspective views of still other coupling devices or assemblies therefor.

In some exemplary embodiment as shown in FIG. 25, the pin support portion 108 may include a base 110 and a pair of webs 112 extending outwardly therefrom. The webs may be configured to support the pin portion 114 therebetween. The webs, in this case, include parallel passages 116 to receive a corresponding end region of the pin portion 114, but may also be configured in other ways to support the pin portion 114, such as by the use of intermediate structure between the webs and the pin portion 114.

The pin portion 114 may include an outer sleeve portion 117 located on a pin structure 118, and the pin structure 118 held relative to the webs 112. For instance, the pin structure 118 may extend into the parallel passages 116 to be positioned therein. Such positioning may be carried out by welding to form a welded seam shown at 120, or by using other mechanical fasteners of the type shown in other exemplary embodiments herein. For instance, the pin portion 114 may extend through the webs 112 and be held by bolts extending laterally through end regions of the portion extending on both ends thereof beyond the webs.

In some exemplary embodiments, as shown in FIG. 25, the first clamp portion 122 may include at least one, in this case two reinforcing webs 124 which may extend between the second base structure 126 and the flange 128. The second clamp portion 130 may include a channel portion 132 with a flange 134 extending outwardly therefrom, wherein one or more of the channel portion 130 and flange 134 may define a second clamp surface 136. The channel portion 132 may include an inner passage 138 which is dimensioned to receive a first threaded fastener 140 (in this case in the form of a hex nut) therein in manner to prevent rotation of the threaded fastener 140. The channel portion 132 and/or flange 134 may also be further configured to receive a second complementary threaded fastener 142 extending between the first and second clamp portions 122, 130, and through passages in the channel portion 132 and flange 134.

Figure 26:
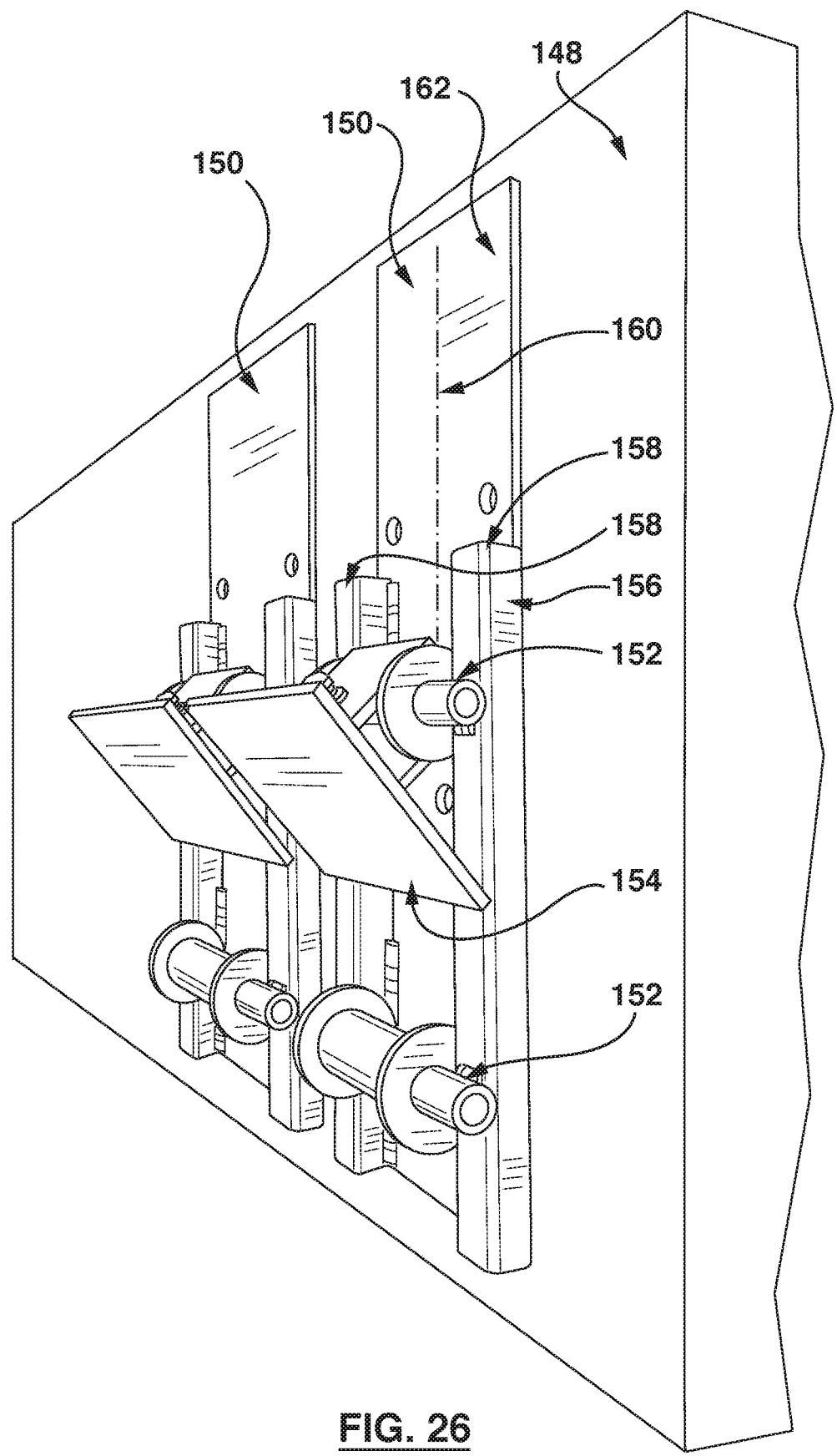

In some exemplary embodiments as shown in FIG. 26, a pin assembly may be provided for use in securing a dock or other neighbouring structure in position, comprising at least one pin portion 152 for use with a clamp portion shown at 154 according to a exemplary embodiment herein described, and at least one pin support portion 156 to support the pin portion 152. The pin support portion 156 may be configured to be mounted on a dock or on a shore based anchoring structure 148.

In some exemplary embodiments as shown in FIG. 26, the pin support portion 156 may include a plurality of (in this example a pair of) pin support members 158 extending along a longitudinal axis 160. The at least one pin portion 152 may include a plurality of pin portions 152 positioned along the pin support members 158, wherein each pin portion is, in use, at an elevation for engaging a corresponding, clamp portion 154 in a designated operative mode. The pin support members may extend along opposed edge regions of a base 162, wherein the base 162 is configured to be anchored on the dock or the anchoring structure. Alternatively, the pin support members 158 may be affixed directly to the dock or the anchoring structure without need for the base 162. Alternatively, the base 162 may be integrally formed with the dock or the anchoring structure. Thus, such exemplary embodiments provide a plurality of pin portions 152 aligned at a number of elevations at a designated anchoring location on the dock or the anchoring structure, or another structure as desired.

Thus, as shown in FIG. 26, the pin portions 152 are presented as a lower pin portion and an upper pin portion, thereby providing two alternative clamping elevations for the clamp portion, such as a lower elevation for use in lower, water levels at the shoreline and a higher elevation for use in higher water levels at the shoreline. The spacing between the pin assemblies 150 are illustrative only and may be increased as need be. Furthermore, a single such pin portion may be used in some cases, as well as more than two pin portions, depending on the circumstances.

Some exemplary embodiments may provide a pin or bit with a partial or continuous, parallel or perpendicular mounted pin support formed thereon, in a manner that maintains the operative range of rotation of the pin or bit about the first axis, while the clamp or bite is configured to enable the operative range of motion while retaining the pin therein, when coupled therewith.

Some exemplary embodiments may provide a dock coupler having a mounting plate with a gasket, coating, finish or the like to minimize the effects of galvanic and chemicals reactions, such as rust or other oxidation.

Some exemplary embodiments may provide an actuation device which is configured to reduce friction between the pin-bit and clamp-bite, by way of one or more non-conductive materials, alleviating galvanic reactions and the like, while providing a visual indicator that the coupling is complete, for example by a collapsible, expandable or deformable material, such as resilient plastic materials in a variety of configurations and consistencies, to assume a visually indicative state under the forces of an actuation bolt, or the like.

Some exemplary embodiments may provide a clamp bite, with an outer sleeve which is oversized to provide controlled play between the first and second clamp surfaces, to generate a slip or slide effect over the pin or bit retained by the clamp or bite and clamp or tooth.

In some exemplary embodiments, the actuator may include a locking washer to withstand unwanted movement of the threaded fastener.

In some exemplary embodiments, the actuator may include a threaded fastener with a spring between clamp or bite and the clamp or tooth for non-gravitational uses.

In some exemplary embodiments, the actuator may include an electric, mechanical, hydraulic or air activation fastener in a continuous pin or bit engaged mode.

In some exemplary embodiments, the actuator may include a twist turn engagement of clamp or tooth fastener.

In some exemplary embodiments, the actuator may include a marred, burred, squeezed, capped, or other mode to disrupt thread function after assembly ending threads of actuator to retain all parts to the fastener.

Some exemplary embodiments may further comprise an actuator mounted on one of the first and or second clamp bite or tooth portions, the actuator being accessible from preferred plane of accessibility wherein use.

Some exemplary embodiments may further comprise an actuator mounted on one of the first and or second clamp bite or tooth portions, the actuator being operable through electrics, air, hydraulic or solenoids from any suitable other location other than on upper deck surface of the dock segment.

In some exemplary embodiments, the indicator member may be a rubber washer which, in the pin or bit-engaged configuration is sufficiently squeezed to become a galvanic barrier defusing metal corrosion of the actuator or clamp or bite housing.

Some exemplary embodiments may include one or more of the following:
  i) A mounting plate or frame of dock for attachment;
  ii) A pin or bit as a bolted attachment to a dock segment with a nut retainer;
  iii) A retained pin or bit as round on square spaced from its associated support structure, such as by the use of stand-off spacers or the like;
  iv) A clamp bite or tooth;
  v) Spacer washers to retain a clamp-bite housing onto a retained pin or bit portion;
  vi) A clamp or bite housing connected with a clamp or bite as assembled;
  vii) A bolt as an actuation apparatus, including a lock washer, flat washer, rubber washer as visual engagement and galvanic separation, with bolt through clamp housing (without spring apparatus for detachment), the clamp or tooth and tooth retainer bracket and the extended length of bolt apparatus, bolt with the burred threads as the detainment of all parts inclusive;
  viii) Decking with an access hole or through decking to operate the actuator;
  ix) A horizontal application of the coupler between a dock segment and a dock ramp.
  x) A fixed horizontal dock segment with a vertical assembly of frame wood, composites or metal pipe dock and legs attached with direct mounted pin or bit as partial or continuously across dock segment frame and the attachment of clamp or bite and clamp tooth activated and assembled while maintained in vertical plane then lowered to service, providing the ability to install and remove by raising the dock segment upwardly, by way of a rotation in the coupling device about an axis.
  xi) A hinge coupler with a small out take of pin or bit as elongated but short segment flange attached along axis on the under-side opposing bite flange, as an attachment to mounting flange or plate and the clamp or bite with the retained sides using the pin or bit as the lateral containment inside the clamp or bit housing, for example as shown in FIGS. 18 to 24.

While the present disclosure describes various exemplary embodiments, the disclosure is not so limited. To the contrary, the disclosure is intended to cover various modifications and equivalent arrangements, as will be readily appreciated by the person of ordinary skill in the art.

The invention claimed is:

1. A coupling device for a joining together adjacent dock segments of a dock installation, the coupling device comprising:
an elongate pin portion and at least one clamp portion, each positionable on respective dock segments;

the pin portion having at least one elongate first clamp surface aligned along its length with a central longitudinal first axis and a pin support portion configured for mounting the pin portion on a corresponding mounting region on a first dock segment;

the clamp portion comprising first and second clamp portions forming a pair of opposed second clamp surfaces, and a clamp support portion configured for mounting the clamp portion on a corresponding mounting region on a second dock segment, the first clamp portion including a flange fixed to and extending outwardly from the clamp support portion and having a boundary region which is configured to extend downwardly toward a water surface, the second clamp portion spaced below the boundary region of the first clamp portion to form a pin receiving region therebetween which is configured to be open in a direction toward the water surface and along a longitudinal second axis to receive the pin portion when the second clamp portion is in an open pin-receiving configuration; and the pin portion being configured to be received in the pin-receiving region when the clamp portion is placed thereon;

wherein the second clamp portion is configured to be actuated relative to the first clamp portion between the open pin-receiving configuration and a pin-engaging configuration to receive the pin portion and in which the first axis is substantially aligned with the second axis, with the first clamp surface on the pin portion engaged with the opposed second clamp surfaces for securing the pin portion therebetween, wherein the pin portion is rotatable relative to the clamp portion about the first axis to accommodate relative movement between the adjacent dock segments; wherein the pin portion includes an outer sleeve formed of at least one low-friction material with the first clamp surface formed thereon, to provide controlled play between the first and second clamp surfaces, wherein the second clamp portion includes a channel portion with a flange extending outwardly therefrom, wherein one or more of the channel portion and flange define the second clamp surface, and wherein the channel portion includes an inner passage which is dimensioned to receive a first threaded fastener therein in manner to prevent rotation of the threaded fastener, the channel and/or flange being further configured to receive a second complementary threaded fastener extending between the first and second clamp portions.

2. The device of claim 1, wherein the pin support portion comprises a first base structure, with one or more support structures positioned at designated spaced locations along the pin portion.

3. The device of claim 2, wherein the pin portion has opposed end regions, and the designated spaced locations are in the respective opposed end regions.

4. The device of claim 1, further comprising an actuator operable to displace the second clamp portion relative to the first clamp portion between the pin-receiving and pin-engaging configurations.

5. The device of claim 4, wherein the actuator is configured to be accessible from an upper deck surface of the dock segment.

6. The device of claim 4, wherein the actuator is configured to be accessible from a location other than an upper deck surface of the dock segment.

7. The device of claim 5, wherein the actuator includes a threaded member threadably engaged with one of the first and second clamp portions.

8. The device of claim 1, wherein the second clamp portion further comprises a layer formed of at least one low friction material to provide the second clamp surface thereon.

9. The device of claim 8, wherein the at least one low friction material includes a polymeric material.

10. A dock segment comprising a designated portion of a pin portion or a clamp portion of a coupling device as defined in claim 1.

11. The dock segment of claim 10, wherein the dock segment includes one or more of a floating or non-floating dock span, a ramp, a pier and/or a dock anchor.

* * * * *